United States Patent [19]

Skraba

[11] Patent Number: 4,994,239
[45] Date of Patent: Feb. 19, 1991

[54] CATALYST REGENERATION

[75] Inventor: Frank W. Skraba, Sweeny, Tex.

[73] Assignee: Phillips Petroleum Company, Bartlesville, Okla.

[21] Appl. No.: 576,821

[22] Filed: Feb. 3, 1984

[51] Int. Cl.⁵ .................................................. B01J 8/18
[52] U.S. Cl. .................................... 422/144; 422/310
[58] Field of Search ............... 422/140, 143, 144, 194, 422/207, 310; 239/550, 593, 596; 261/122, 93

[56] References Cited

U.S. PATENT DOCUMENTS

| | | | |
|---|---|---|---|
| 3,298,793 | 1/1967 | Mallison | 23/288 |
| 4,138,219 | 2/1979 | Colvert et al. | 422/144 |
| 4,150,090 | 4/1979 | Murphy et al. | 422/144 |
| 4,259,925 | 4/1981 | Barnert et al. | 118/716 |
| 4,289,729 | 9/1981 | Myers et al. | 422/144 |
| 4,317,798 | 3/1982 | Worley | 422/144 |
| 4,322,384 | 3/1982 | Sutton | 422/144 |
| 4,392,943 | 7/1983 | Euzen et al. | 208/152 |
| 4,443,551 | 4/1984 | Lionetti et al. | 502/41 |

OTHER PUBLICATIONS

Venuto, Paul B and Habib, Thomas, Jr. "Fluid Catalytic Cracking with Zeolite Catalysts", New York, M. Dekker, 1979.

Primary Examiner—Michael S. Marcus
Attorney, Agent, or Firm—George E. Bogatie

[57] ABSTRACT

Nozzle designs and processes introducing the regeneration air into a catalytic cracking unit are disclosed which reduce the probability of erosion induced nozzle failures. Novel features include nozzle length, tip design, and orientation with respect to the air headers.

In one aspect of the invention at least one of the nozzles is positioned substantially vertically downwardly. In another aspect of the invention at least one of the nozzles has a length greater than the outside diameter of the pipe. In another aspect of the invention at least one of the nozzles is provided with a beveled tip. In still another aspect of the invention, at least one of the nozzles is provided with a baffle on its tip.

15 Claims, 4 Drawing Sheets

CATALYST REGENERATION

BACKGROUND OF THE INVENTION

The invention relates to certain aspects of a regenerator in a catalytic cracking unit. In other aspects, the invention relates to regenerating a cracking catalyst.

Cracking catalyst is regenerated by burning off the coke deposits which were laid down during the previous cracking cycle. The coke burn-off usually occurs in a fluidized bed in the presence of air optionally containing steam. The air is distributed into the bed through hundreds of nozzles connected to a piping system. When the nozzles fail, catalyst is drawn into the air piping, cutting the pipes from the inside. The ability to distribute the air throughout the bed is lost. Catalyst can no longer be regenerated properly. Unit product value !falls until the unit must be shut down to repair. Damage could be very extensive due to uncontrolled discharge of air from eroded piping.

OBJECTS OF THE INVENTION

It is an object of this invention to provide an improved catalyst regenerator in a catalytic cracking unit.

It is a further object of this invention to provide improved air distribution nozzles for use in the catalyst regenerator of a catalytic cracking unit.

It is a further object of this invention to provide a method for introducing combustion-supporting air into a bed of cracking catalyst particles to prevent or reduce nozzle failures between unit turnarounds.

SUMMARY OF THE INVENTION

A catalytic cracking unit comprises a cracker and a regenerator. In one embodiment of the invention, there is provided an improved regenerator for the catalytic cracking unit. The outside of the regenerator is defined by a regeneration vessel. The regenerator is provided with a means for the introduction of coked cracking catalyst. The coke on the cracking catalyst is deposited thereon during its residence in the cracker portion of the unit. The regenerator is further provided with a means for withdrawing regenerated cracking catalyst from the regeneration vessel.

At least one oxidant gas distributor is positioned in a lower portion of the regeneration vessel. The oxidant gas distributor is formed from at least one generally horizontally positioned pipe. A plurality of nozzles open through the sidewall of the pipe for the introduction of oxidant gas into the regeneration vessel. In one aspect of the invention at least one of the nozzles is positioned substantially vertically downwardly. In another aspect of the invention, at least one of the nozzles has a length greater than the outside diameter of the pipe. In another aspect of the invention, at least one of the nozzles is provided with a beveled tip. In still another aspect of the invention, at least one of the nozzles is provided with a baffle on its tip.

According to certain other aspects of the present invention, there is provided an improved process for regenerating a cracking catalyst. An oxygen-containing gas is introduced into a fluidized bed of cracking catalyst particles through nozzles arranged on the other side of a generally horizontally positioned grid of lines which supply the oxygen-containing gas. Certain aspects of the invention can be practiced by introducing at least a portion of the oxygen-containing gas into the fluidized bed through nozzles which have a length greater than the outside diameter of the supply lines. Other aspects of the invention can be practiced by introducing at least a portion of the oxygen-containing gas into the fluidized bed through nozzles which are pointed generally vertically downwardly. In still further aspects of the invention, at least a portion of the oxygen-containing gas can be introduced into the fluidized bed through nozzles having a bevel on their discharge end. In still further aspects of the invention, at least a portion of the oxygen-containing gas can be introduced into the fluidized bed through nozzles having a plate affixed to their discharge end.

These and other aspects of the invention are more thoroughly described in the following detailed description with reference to the attached drawings.

DETAILED DESCRIPTION OF THE INVENTION

Figure 1:
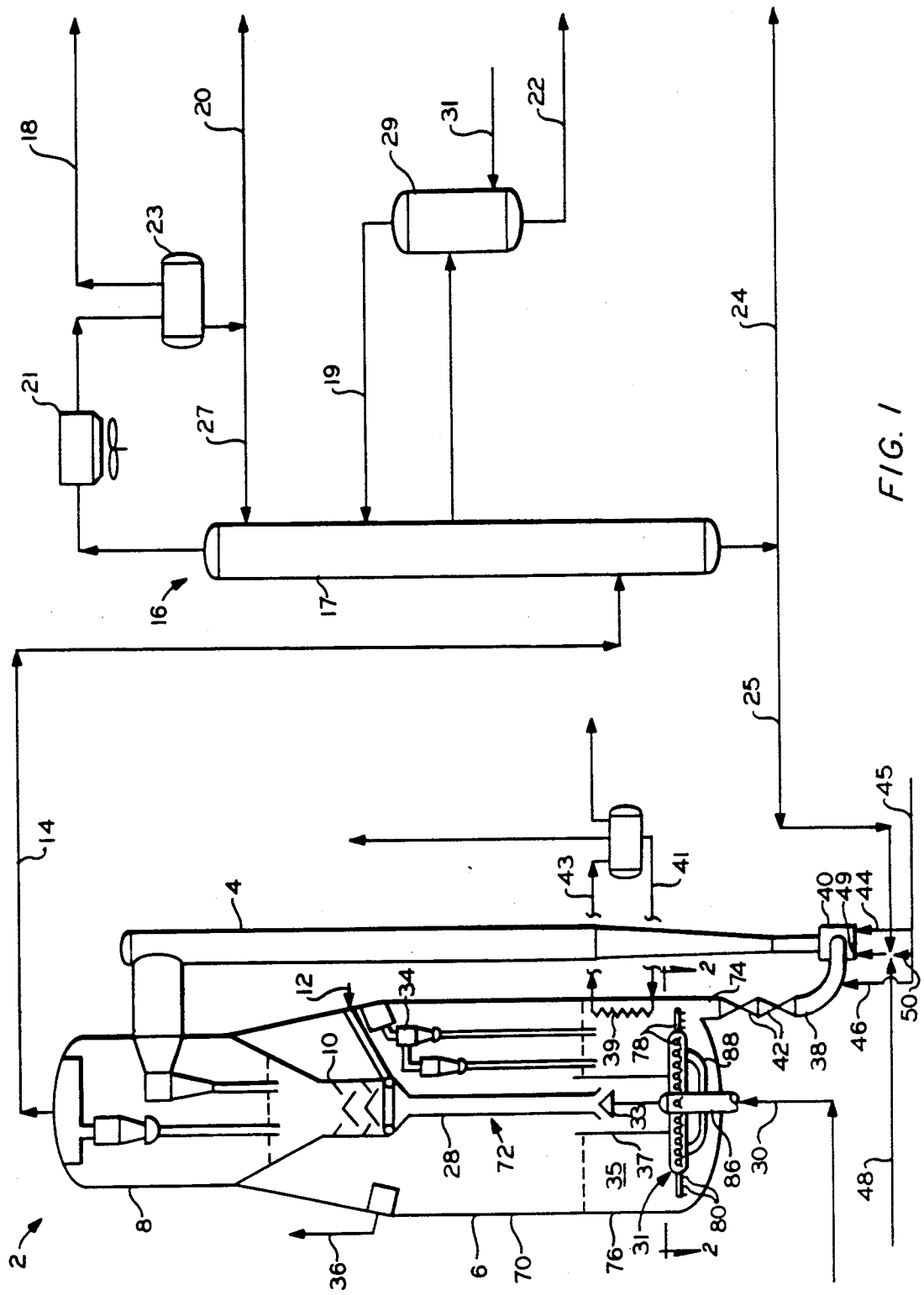
FIG. 1 schematically illustrates certain features of one type of catalytic cracking unit which can embody certain features of the present invention.

With reference to FIG. 1, one type of fluid catalytic cracking unit (FCCU) 2 comprises a riser-reactor 4, a regenerator 6, a catalyst/product separation zone or disengager 8 which usually contains several cyclone separators, and a stripping section or zone 10 in which gas, usually steam such as introduced from line 12, strips entrained hydrocarbon from the coked catalyst. Overhead, product from the separation zone 8 is conveyed via line 14 to a separation zone 16 including a main fractionator 17. The product can be separated, for example, as follows. Light hydrocarbons uncondensed in condenser 21 can be withdrawn from the zone 16 by the line 18. Gasoline range liquids accumulated in accumulator 23 can be withdrawn by the line 20 or refluxed via line 27. Distillates such as light cycle oils can be withdrawn by the line 22 from stripper 29 after being stripped with steam introduced via line 31. The overhead of light hydrocarbons 19 from the stripper can be recycled to column 17. Bottoms from column 17 can be withdrawn by line 24 or recycled to the riser 4 by line 25, as desired.

After being stripped in the zone 10, the cracking catalyst is conveyed from the zone 10 to the regenerator 6 by line or standpipe 28 for coke burnoff. Flow of catalyst into the regenerator 6 can be controlled by a plug valve 33 positioned under the outlet of the standpipe 28. The catalyst can be distributed from the standpipe 28 into a dense phase fluidized bed 35 by flowing over a weir 37 positioned in the regenerator 6. In the regenerator 6, molecular oxygen containing gas, usually air or an air/steam mixture, is introduced by a line 30 and distributed by one or more distributors 31. Coke deposits are burned from the catalyst in the regenerator 6 forming an effluent gas which is separated from the catalyst in a plurality of cyclone separators 34. These flue gases are withdrawn from the regenerator 6 by the line 36. Coil 39 in the regenerator 6 is used to convert boiler feed water introduced via line 41 into high pressure steam which is withdrawn via line 43. Hot regenerated catalyst passes from the regenerator 6 to a lift pot 40 at the lower end of the riser-reactor 4 by line 38, which provides a source of hot, low carbon containing cracking catalyst particles for the riser-reactor 4.

The catalyst flows from the regenerator to a lift zone 40 at the bottom of riser 4 through a line 38. The flow rate of catalyst is controlled by valves 42 which are positioned in the line 38, preferably in a vertical portion thereof. In the lift zone 40, catalyst from the line 38 is fluidized with a fluidizing gas, usually steam, which is introduced into the lift zone 40 and/or lower portion of line 38 by lines 44 and/or 46 connecting to steam source 45. The oil feedstock is introduced into the lift zone 40 via a nozzle assembly 49 which is connected to a source of oil feedstock such as a gas oil feed line 48 and the recycle line 25. Atomizing gas such as steam can be added to the nozzle assembly 49 by line 50, for example, which connects the nozzle assembly 49 to the steam source 45.

The operating conditions for the riser-reactor 4 and regenerator 6 can be conventional. Usually, the temperature in the riser-reactor 4 will be in the range of from about 850° to about 1050° F. preferably in the range of 925° to 1025° F. for heavy oils. The oil is usually admixed with steam at a weight ratio of oil to steam in the range of from about 6:1 to about 25:1. A catalyst:oil weight ratio employed in the riser-reactor 4 is generally in the range of from about 2:1 to about 20:1, usually between about 2:1 and about 15:1, preferably between about 3:1 to about 10:1. Pressure in the riser-reactor 4 is usually between about 15 and about 60 psia (pounds per square inch absolute), preferably less than about 25 psia for heavy oils. The cracking catalyst particles generally have a size in the range of from about 20 to about 200 microns, usually between about 40 and 80 microns, preferably principally about 60 microns. Flow velocity upward in the vertical section of the riser-reactor is generally from about 10 to 30 feet per second in the lower portion up to between about 40 and about 120 feet per second in the upper portions. The contact time between the catalyst and oil in the riser-reactor is generally in the range of from about 0.25 to about 4 seconds, usually from 1 to about 3 seconds when the oil is injected into the bottom of the riser. Preferably, contact times for heavy oils are less than 2.5 seconds. The regenerator is operated at a temperature typically in the range of from about 1100° to about 1500° F., usually from about 1150° to 1450° F., and is ordinarily provided with sufficient oxygen containing gas to reduce the coke on the catalyst to a level of about 0.5 weight percent or less, preferably less than 0.1 weight percent.

Catalysts suitable for catalytic cracking includes silica-alumina or silica-magnesia synthetic microspheres or ground gels and various natural clay-type or synthetic gel-type catalysts. Most preferably, fluidizable zeolite-containing cracking catalysts are employed. Preferred catalysts can contain from about 2 to about 20 percent based on total weight of zeolitic material dispersed in a silica-alumina matrix and have a B.E.T. surface area in the range of 50–500 $m^2/g$ and a particle size chiefly in the range of 40–80 microns.

The present invention is applicable to most any regenerator for a catalytic cracking unit. Generally speaking, catalyst regenerators will comprises a regeneration vessel 70. The regeneration vessel 70 will be provided with a means 72 for the introduction of coked cracking catalyst. The standpipe 28 can serve as the means 72, for example. The vessel 70 is further provided with a means 74 for withdrawing regenerated cracking catalysts from the vessel 70. The line 38 can serve as the means 74, for example. The at least one oxidant gas distributor 31 is positioned in a lower portion 76 of the regeneration vessel 70. The oxidant gas distributor 31 is formed from at least one generally horizontally positioned pipe 78 with a plurality of nozzles 80 opening through the sidewall of the generally horizontally positioned pipe for the emission of oxidant gas from the inside of the generally horizontally positioned pipe 78 to the inside of the regeneration vessel 70.

Figure 2:
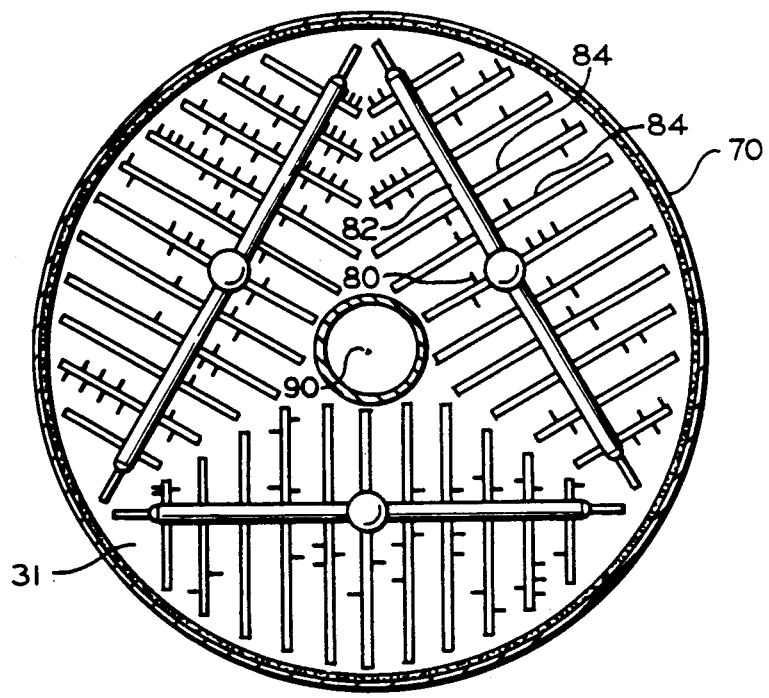
FIG. 2 illustrates a cross section of a portion of the unit in FIG. 1 when viewed along lines 2—2.

In FIG. 1, only one oxidant gas distributor is illustrated for purposes of clarity. FIG. 2 illustrates an embodiment of the invention wherein a plurality of oxidant gas distributors 31 are positioned in the regeneration vessel 70. In this embodiment, each of the oxidant gas distributors 31 comprises a generally horizontally positioned main air header 82 and a plurality of generally horizontally positioned laterals 84 connected to each of the main air headers 82. The main air header 82 and laterals 84 are preferably formed from generally straight pipe sections and at least most of the nozzles 80 open into the regeneration vessel 70 through the sidewalls of the laterals 84. Preferably the vessel 70 contains three of the oxidant gas distributors 31 where other structure is axially positioned in the regenerator vessel, because three have been used in such a unit to provide good distribution of the oxidant gas. In a preferred arrangement, each of the oxidant gas distributors 31 comprises a generally vertically positioned supply pipe 86 extending into the lower portion 76 of the vessel 70. The supply pipe 86 is connected to about the midpoint of each of the main air headers 82. Secondary pipe arms 88 preferably extend between the generally vertical supply pipe 86 and the generally horizontally positioned main air header 82 connecting to positions on each which are spaced apart from the midpoint of the main air header. By supporting the air distributors in this manner, temperature induced stresses can be maintained at low values. By spacing the generally vertically positioned supply pipes 86 generally equidistantly from each other and generally equidistantly from a longitudinal axis 90 of the regeneration vessel 70, each of the air distributors 31 can be sufficiently structurally similar to facilitate fabrication. The laterals 84 are preferably connected generally normally to each of the main air headers 82 and define a generally horizontally positioned pipe grid or system with nozzles opening through the sidewall of the pipe. The laterals 84 preferably vary in length with the laterals 84 near the ends of the main air headers 82 generally being shorter than the laterals near the midpoints of the main air headers to provide for an oxidant gas supply grid which provides air with good uniformity across the regeneration vessel in a plane which is generally normal to the longitudinal axis 90 of the regeneration vessel 70. The nozzle 80 in FIG. 2 illustrate only a portion of the nozzles which would be placed in a commercial unit, normally several hundred. The illustrated nozzles 80 are patterned to represent a pattern of eroded nozzles which was observed during shutdown of a commercial unit. Severe erosion was discovered on the bottom side of the air nozzles. Holes were found in some of the nozzles, worn completely through the 1¼ inch Schedule 160, 304 stainless steel erosion appeared to be external on the underside tips of those nozzles pointing outward toward the regenerator walls. Primary eroded nozzle areas were at the tailend laterals on the main air headers and the first eroded nozzles were on the shorter laterals near the ends of the main air headers.

Figure 3:
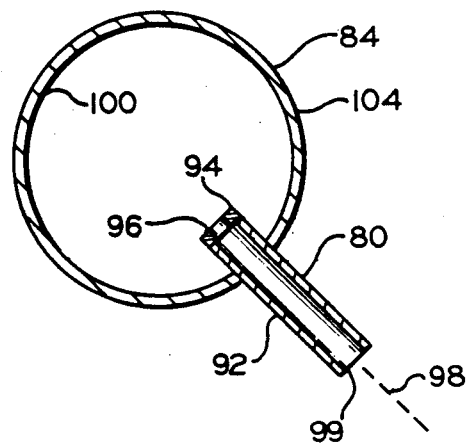
FIG. 3 is a cross-sectional view of a portion of a "prior art" apparatus shown in FIG. 2 when viewed radially outwardly.

The design of the eroded nozzles is illustrated in FIG. 3. The nozzles 80 are formed from a generally straight pipe section 92 extending downwardly through the sidewall of the lateral 84 generally normally to the lateral and at an angle of 45° from the vertical. The nozzles could probably be turned from the vertical in this type of distribution system at an angle in the range of from about 20° to about 70° without substantial difference in result. The inlet end 94 of the nozzle 80 is defined by a generally annular flange 96 extending generally radially inwardly from the straight pipe section 92 toward a longitudinal axis 98 of the nozzle 80. The inlet end is spaced apart from the inside wall 100 of the lateral 84 one inch, although the positioning of the inlet end of the nozzle could probably be varied from 0.5 to about 2 inches from the inside wall 100 of the lateral 84 without substantial difference in result where the lateral 84 had an inside diameter of between about 5 and 10 inches. The hole defined by the generally annular flange 96 was drilled after the flange was welded to the pipe section and has an inside diameter of 15/16 inches. The pipe section is formed from 1¼ Schedule 160 stainless steel pipe. The discharge end 99 of the nozzle 80 was spaced apart 3.4 inches in one design and 6 inches in another design from the outside wall 104 of the lateral 84.

Figure 4:
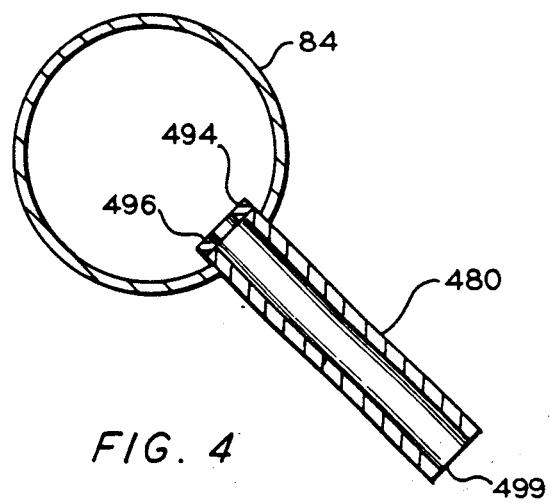
FIG. 4 is a view from the same perspective as in FIG. 3 illustrating certain features of one embodiment of the invention.

With reference to FIG. 4 and in accordance with certain aspects of one embodiment of the present invention, at least one nozzle is provided in the regenerator opening through the sidewall of the generally horizontal pipe which has a length greater than the outside diameter of the generally horizontal pipe. For a lateral 84 having a 6-inch outside diameter, good results are expected by providing an improved nozzle 180 having a length of, for example, 8 inches. The length of the nozzle 180 is measured between the inlet end 496 and the outlet end 499 of the nozzle. The nozzles 480 can be used in combination with other types of nozzles if desired, but are preferably used in severe duty areas. Preferably, a concentration of the improved nozzles 480 are positioned on at least one of the shorter laterals 84 near the ends of at least one of the main air headers 82. The nozzle 180 is preferably directed generally downwardly and normally to the lateral an angle of between about 0° and about 75° from the vertical and the inlet end 496 is preferably defined by a generally annular flange 494 which extends generally radially inwardly toward the longitudinal axis of the nozzle. The inlet end is generally positioned in the range of from about 0.5 to about 2 inches from the inside wall of the lateral and the nozzle will usually have a length which is in the range of from about 1 to 2 times the outside diameter of the lateral.

Figure 5:
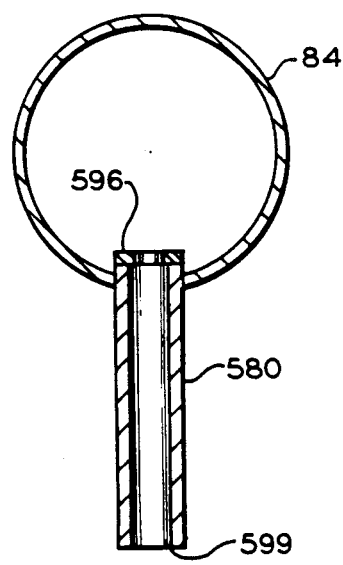
FIG. 5 is a view from the perspective of FIG. 3 illustrating certain features of another embodiment of the invention.

With reference to FIG. 5, according to certain other aspects of the present invention, a nozzle improvement is provided comprising at least one nozzle 580 opening through the sidewall of the generally horizontal pipe and directed substantially vertically downwardly. Preferably, the nozzle 580 opens through the sidewall of the lateral 84. More preferably, the nozzle 580 has a length as measured between an inlet end 596 and an outlet end 599 which is greater than the outside diameter of the lateral 84. For example, where the lateral 84 has a 6-inch outside diameter, a nozzle 580 having an overall length of about 8 inches is expected to provide good results. Preferably, a concentration of the nozzles 580 is provided on at least one of the shorter laterals near the end of at least one of the main air headers. The inlet end of the nozzle 580 will usually be positioned in the range of from about 0.5 to about 2 inches from the inside wall of the lateral. The nozzles 580 can be used in combination with the nozzles 80 as shown in FIG. 3. In such instances, a majority of the nozzles are formed from generally straight pipe sections which extend through the sidewalls of the laterals generally normally to the lateral at an angle of between about 20° and about 70° from the vertical.

Figure 6:
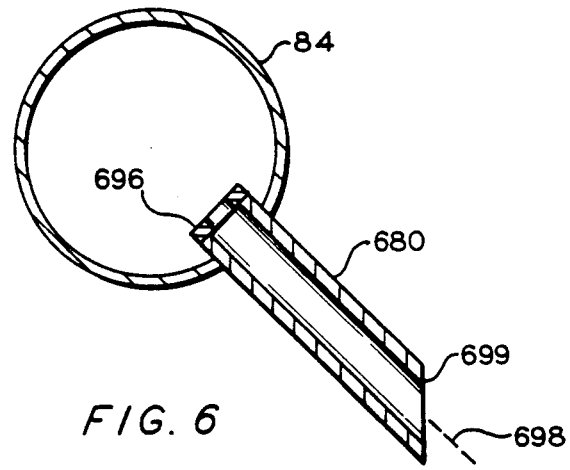
FIG. 6 is a view from the perspective of FIG. 3 illustrating certain features of another embodiment of the invention.
Figure 7:
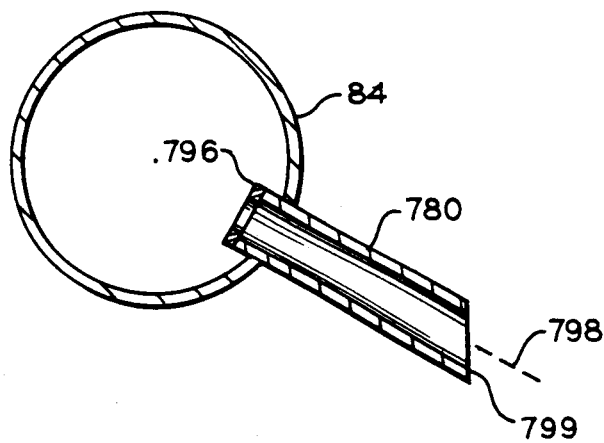
FIG. 7 is a view from the perspective of FIG. 3 illustrating certain features of another embodiment of the invention.

With reference to FIGS. 6 and 7, an improved nozzle is provided for the regenerator which comprises at least one bevel-tip nozzle 680 in FIG. 6, nozzle 780 in FIG. 7. The nozzle opens through the sidewall of the generally horizontal pipe, preferably a lateral 84. Preferably, the nozzle is positioned normally to the sidewall of the lateral and downwardly at an angle of between about 10° and about 80° from the vertical. In the embodiment of the invention shown in FIG. 6, the nozzle is preferably positioned at an angle of between about 20° and about 50° from the vertical, as measured from a longitudinal axis 698 of the nozzle 680 and plumb. In FIG. 7, the nozzle is preferably positioned at an angle which ranges between about 50° and 80° from the vertical, as measured from a longitudinal axis 798 of the nozzle and plumb. An inlet end 696 of the nozzle 680, 796 of the nozzle 780 is preferably spaced apart from the inside surface of the lateral 84 in a manner as previously described. A discharge end 699 in FIG. 6 and 799 in FIG. 7 of the nozzles is preferably beveled in a plane which form an angle in the range of from about 10° to about 80° with respect to the longitudinal axis 698, 798 of the nozzle.

Preferably, the discharge end of the bevel-tip nozzle is beveled in a plane which is about parallel to the longitudinal axis 90 of the regeneration vessel and further about parallel of the lateral. For application to a regenerator as illustrated in FIGS. 1 and 2, a concentration of the bevel-tip nozzles is preferably positioned on at least one of the shorter laterals near the end of at least one of the main air headers. The nozzles of course will be concentrated at least where more severe erosion problems have been observed or expected. The nozzles 680 and 780 of course are well adapted to be used in combination with the nozzles as shown in FIG. 3 and can be used either in addition to these nozzles or, preferably, substituted for these nozzles, or both if desired. The bevel-tip nozzles preferably are formed from generally straight pipe sections and extend through the sidewall of the lateral and the inlet end of the nozzle is provided with a generally radially inwardly extending annular flange in a manner as previously described. The inlet end of the nozzle is preferably positioned in the range of from about 0.5 to about 2 inches from the inside wall of the lateral. For a nozzle as shown in FIG. 6, the length of the nozzle is preferably greater than the outside diameter of the lateral. For a nozzle as shown in FIG. 7, the length of the nozzle is preferably slightly less than the outside diameter of the lateral. The length of the bevel-tip nozzles is measured from the inlet end 696 or 796 of the nozzle to the beginning of the bevel at the discharge end 699 or 799 of the nozzle.

Figure 8:
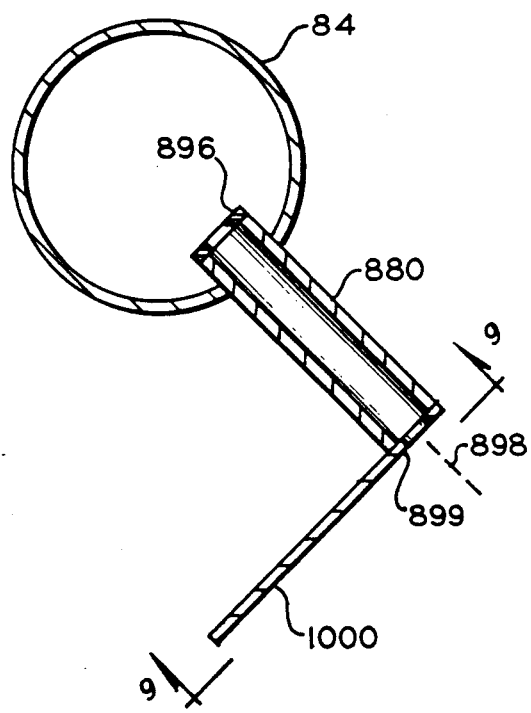
FIG. 8 is a view from the perspective of FIG. 3 illustrating certain features of another embodiment of the invention.
Figure 9:
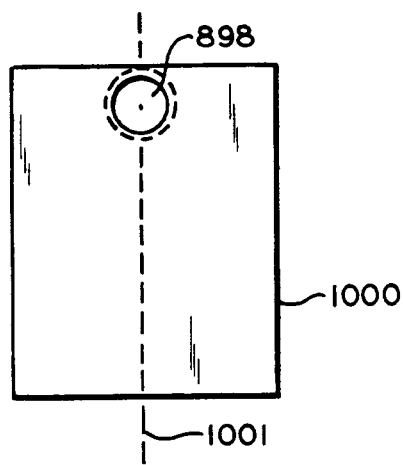
FIG. 9 is a view along lines 9—9 of FIG. 8.

With reference to FIGS. 8 and 9, there is provided for a regenerator in a catalytic cracking unit an improvement which comprises at least one baffle-tip nozzle 880. The baffle-tip nozzle 880 opens through the sidewall of the generally horizontally positioned pipe, such as the lateral 84. The baffle-tip nozzle 880 has an inlet end 896 and a discharge end 899. A plate 1000 is affixed to the discharge end of the nozzle. The baffle tip nozzle preferably is positioned generally normally to the lateral 84 and extends downwardly at an angle of between about 10° and about 80° from the vertical. The plate 1000 is preferably affixed to the discharge end 899 of the nozzle 880 in a plane which is generally normal to a longitudinal axis 898 of the nozzle 880. Preferably, the plate 1000 has a generally rectangular shape and a longitudinal axis 1001 lying in the plane of the plate. The plate is preferably positioned so that the longitudinal axis 1001 of the plate 1000 extends downwardly in a vertical plane from the longitudinal axis of the nozzle 880. The nozzle is preferably attached to the plate so that the longitudinal axis of the nozzle is spaced at least 0.5 outside diameters of the nozzle from the edge of the plate 1000, a borehole through the plate connecting to the nozzle interior. The nozzle 880 can be used with other types of nozzles if desired. To reduce the possibility of severe erosion damage a concentration of the baffle-tip nozzles 880 are preferably positioned on at least one of the shorter laterals 84 near the end of at least one of the main air header 82. In such an embodiment, a majority of the nozzles will be formed without plates from generally straight pipe sections and will be positioned generally normally to the lateral at an angle of between about 20° and about 70° from the vertical. The inlet end of the nozzle 880 as well as the other nozzles when present will preferably be defined by generally annular flange which extends radially inwardly toward a longitudinal axis of the nozzle. The inlet end of the nozzle will usually be positioned in the range of from about 0.5 to about 2 inches from the inside wall of the lateral.

The invention can be practiced if desired by introducing an oxygen-containing gas into a fluidized bed of cracking catalyst particles. Where the oxygen-containing gas is introduced through nozzles arranged on the underside of a generally horizontally positioned system of supply lines arranged to form a generally horizontally positioned grid, the invention can be practiced by introducing at least a portion of the oxygen-containing gas through the inventive nozzles and nozzle arrangement provided by certain aspects of the invention. In one embodiment, the oxygen-containing gas can be introduced through nozzles having a length greater than the outside diameter of the supply lines. In another embodiment, the oxygen-containing gas can be introduced into the fluidized bed through nozzles which are pointed generally vertically downwardly. In a still further embodiment, the invention can be practiced by introducing at least a portion of the oxygen-containing gas into the fluidized bed through nozzles having a beveled discharge end. In a still further embodiment of the invention, at least a portion of the oxygen-containing gas can be introduced into the fluidized bed through nozzles having a discharge end with a plate affixed thereto.

Preferably, the oxygen-containing gas is circulated through a generally vertically positioned pipe and into a generally horizontally positioned main air header enroute to the nozzles. A plurality of generally horizontally positioned laterals are connected to the main air headers and the nozzles are attached to the laterals. The laterals form at least a portion of the generally horizontally positioned grid of supply lines and are preferably generally connected normally to the main air headers. The laterals are usually various lengths with the laterals near the ends of the main air headers generally being shorter than the laterals near the midpoints of the main air headers. Preferably, the laterals near the midpoints of the main air headers have a slightly larger diameter than the laterals near the ends of the main air headers to equalize the pressure drop between the main air header and the ends of the laterals. The laterals are usually closed off at their ends. Usually, the nozzles are arranged on the undersides of the laterals and at least a major portion of the inventive nozzles are concentrated on the underside of at least one of the shorter laterals near the ends of the main air header. Where the inventive nozzles are used to replace standard nozzles found in high erosion areas of the unit, generally only a minor portion of the nozzles in the unit will be of the inventive types. For example, a unit containing about 2,000 nozzles may only contain about 500 of the inventive nozzles.

The invention is further illustrated by the following example.

EXAMPLE

TABLE

| Item | Design |
|---|---|
| Charge Oil at 470° F. | |
| (25) Recycle bottoms | 9,300 BPD |
| Density | 11° API |
| (48) Hydrotreated residuum | 47,500 BPD |
| Density | 20° API |
| (22) Atmos. tower side draw gas oil | 2,500 BPD |
| Density | 33° API |
| Riser Steam Added at 470° F. | 40,000 lb/hr |
| (46) + (44) + (50) | |
| (12) Stripping Steam at 470° F. | 500 psig |
| (46) + (44) 366° F. Blast Steam | 1,800 lb/hr |
| (38) Regenerated Catalyst at 1280° F. | 45 ton/min |
| (30) Air for Regeneration | |
| Rate | 960,000 lb/hr |
| Temperature | 440° F. |
| Pressure | 55 psia |
| (6) Regenerator | |
| Pressure | 48 psia |
| Temperature | 1280° F. |
| Diameter | 49 ft |
| Length | 110 ft |
| (31) Air Distributors | 3 ea. |
| (86) Vertical Pipe | 40 in. I.D. |
| Distance from axis 90 | 13'-6" |
| (82) Horizontal Distributor (82) | 25¼ in. I.D. |
| Laterals/Distributor | 36 ea. |
| (84) Middle laterals | 8 in. I.D. |
| (84) Outer Laterals | 6 in. I.D. |
| (-80) Nozzles (1¼ in. #304 SS Schedule 160) | 1.160 in. I.D. |
| Length | 7-10 inches |
| (796) Nozzle end plate | 1 11/16 in. O.D. |

TABLE-continued

| Item | Design |
|---|---|
| (¼" 304 SS) | 15/16 in. I.D. (hole) |
| (1000) Nozzle end plate | 1¼ in. |
| (¼" × 6 × 7" 304 plate) | |
| Nozzle inlet set-in from lateral | |
| (4) Riser-Reactor | |
| Throat | 40 in. I.D. |
| Reaction Zone | 50 in. I.D. |
| Vertical Length | 149 ft. 4" |

What is claimed is:

1. In a regenerator for a catalytic cracking unit, said regenerator comprising
   (a) a regeneration vessel having a longitudinal axis;
   (b) a means for introducing coked cracking catalyst into the regeneration vessel;
   (c) a means for withdrawing regenerated cracking catalyst from the regeneration vessel, and
   (d) at least one oxidant gas distributor positioned in a lower portion of the regeneration vessel, said oxidant gas distributor being formed from at least one generally horizontally positioned pipe defined by a sidewall and having a longitudinal axis with nozzles opening through the sidewall for the introduction of oxidant gas into the regeneration vessel;
   the nozzle improvement comprising at least one beveled-tip nozzle opening through the sidewall of the generally horizontally positioned pipe positioned normally to the sidewall of the generally horizontal pipe and downwardly at an angle of between about 10° and about 80° from the vertical, said at least one nozzle having an inlet end and a discharge end with the discharge end being beveled in a plane forming an angle in the range of from about 10° to about 80° with respect to the longitudinal axis of the nozzle.

2. A regenerator as in claim 1 wherein the discharge end of the at least one beveled-tip nozzle is beveled in a plane which is about parallel to the longitudinal axis of the regeneration vessel and further about parallel to the longitudinal axis of the generally horizontally positioned pipe.

3. A regenerator as in claim 2 wherein a plurality of oxidant gas distributors are positioned in the regeneration vessel and each of said oxidant gas distributors comprises a generally horizontally positioned main air header and a plurality of generally horizontally positioned laterals connected to the main air header, said main air header and laterals being formed from generally straight sidewall pipe sections, at least most of the nozzles opening into the regeneration vessel through the sidewalls of the laterals.

4. A regenerator as in claim 3 wherein three distributors are positioned in the regeneration vessel and each f said distributors further comprises a generally vertically positioned supply pipe connected to about the midpoint of the main air header, said generally vertically positioned supply pipes being generally equidistantly spaced from each other and generally equidistantly spaced from a longitudinal axis of the regeneration vessel; the laterals being connected generally normally to the main air headers and being of various lengths with the laterals near the ends of the main air headers generally being shorter than the laterals near the midpoints of the main air headers, said nozzle improvement comprising
   a concentration of the beveled-tip nozzles positioned on at least one of the shorter laterals near the end of at least one of the main air headers.

5. A regenerator as in claim 4 wherein a majority of the nozzles for the emission of oxidant gas from the laterals do not have a beveled tip and are formed from a generally straight pipe section extending through the sidewall of the lateral generally normally to the lateral at an angle of between about 20° and about 70° from the vertical, the inlet end of the majority of the nozzles being defined by a generally annular flange extending generally radially inwardly toward a longitudinal axis of the nozzle and being positioned in the range of from about 0.5 to about 2 inches from the inside wall of the lateral.

6. A regenerator as in claim 5 wherein the beveled-tip nozzles are formed from a generally straight pipe section which extends through the sidewall of the lateral, the inlet end of the nozzle having a generally radially inwardly extending annular flange and being positioned in the range of 0.5 to about 2 inches from the inside wall of the lateral, said nozzle having length, as measured from the inlet end to the beginning of the bevel at the discharge end, which is less than the outside diameter of the lateral.

7. A regenerator as in claim 6 wherein the longitudinal axis of the beveled-tip nozzle is between about 50° and about 80° from the vertical.

8. A regenerator as in claim 5 wherein the beveled-tip nozzles are formed from a generally straight pipe section which extends through the sidewall of the lateral, the inlet end of the beveled-tip nozzles having a generally radially-inwardly extending annular flange and being positioned in the range of 0.5 to about 2 inches from the inside wall of the lateral, said beveled-tip nozzle having a length, as measured from the inlet end to the beginning of the bevel at the discharge end, which is greater than the outside diameter of the lateral.

9. A regenerator as in claim 8 wherein the longitudinal axis of the beveled-tip nozzle is at an angle of between about 20 and about 50 from the vertical.

10. In a regenerator for a catalytic cracking unit, said regenerator comprising
    (a) a regeneration vessel;
    (b) a means for introducing coked cracking catalyst into the regeneration vessel;
    (c) a means for withdrawing regenerated cracking catalyst from the vessel, and
    (d) at least one oxidant gas distributor positioned in a lower portion of the regeneration vessel, said oxidant gas distributor being formed from at least one generally horizontally positioned pipe formed from a sidewall with nozzles opening through the sidewall of the generally horizontally positioned pipe for the introduction of oxidant gas into the regeneration vessel;
    the nozzle improvement comprising at least one baffled-tip nozzle opening through the sidewall of the generally horizontally positioned pipe, said at least one baffled-tip nozzle having an inlet end and a discharge end and a plate affixed to the discharge end.

11. A regenerator as in claim 10 wherein the at least one baffled-tip nozzle is positioned generally normally to the generally horizontal pipe and extends downwardly at an angle of between about 10° and about 80° from the vertical, the plate being affixed to the discharge end of the nozzle in a plane which is generally normal to the longitudinal axis of the nozzle.

12. A regenerator as in claim 11 wherein the plate has a generally rectangular shape and a longitudinal axis lying in the plane of the plate, said plate being positioned so, that the longitudinal axis of the plate extends downwardly in a vertical plate from the longitudinal axis of the nozzle.

13. A regenerator as in claim 12 wherein a plurality of oxidant gas distributors are positioned in the regeneration vessel and each of said oxidant gas distributors comprises a generally horizontally positioned main air header and a plurality of generally horizontally positioned laterals connected to the main air header, said main air header and laterals being formed from generally straight sidewall pipe sections, and at least most of the nozzles opening into the regeneration vessel through the sidewalls of the laterals.

14. A regenerator as in claim 13 wherein three distributors are positioned in the vessel and each of said distributors further comprises a generally vertically positioned supply pipe connected to about the midpoint of the main air header, said generally vertically positioned supply pipes being generally equidistantly spaced from each other and generally equidistantly spaced from a longitudinal axis of the regeneration vessel; the laterals being connected generally normally to the main air headers and being of various lengths with the laterals near the ends of the main air headers generally being shorter than the laterals near the midpoints of the main air headers, said nozzle improvement further comprising a concentration of said baffled-tip nozzles positioned on at least one of the shorter laterals near the end of at least one of the main air headers.

15. A regenerator as in claim 14 wherein a majority of the nozzles for the emission of oxidant gas from the laterals are formed without plates from a generally straight pipe section extending through the sidewall of the lateral generally normally to the lateral at an angle of between about 20° and about 70° from the vertical, the inlet end of the majority of the nozzles being defined by a generally annular flange extending generally radially inwardly toward a longitudinal axis of the nozzle and being positioned in the range from about 0.5 to about 2 inches from the inside wall of the lateral.

* * * * *